United States Patent [19]
Wilson

[11] 3,715,001
[45] Feb. 6, 1973

[54] ENGINE COOLING SYSTEM FOR VEHICLES

[75] Inventor: Harry R. Wilson, Milwaukee, Wis.

[73] Assignee: McQusy-Perfex Inc.

[22] Filed: June 4, 1970

[21] Appl. No.: 43,367

[52] U.S. Cl. ................................................180/68 R
[51] Int. Cl. ............................................B60k 11/04
[58] Field of Search ..................180/68, 54 A, 54 R

[56] References Cited

UNITED STATES PATENTS

| | | | |
|---|---|---|---|
| 2,123,991 | 7/1938 | Fageol | 180/68 |
| 2,242,494 | 5/1941 | Wolf | 180/54 A |
| 2,396,506 | 3/1946 | Harris | 180/54 A UX |
| 2,769,501 | 11/1956 | Wagner | 180/68 P |
| 2,913,065 | 11/1959 | Lyon, Jr. | 180/54 A |
| 3,207,250 | 9/1965 | Bamford | 180/54 A X |

FOREIGN PATENTS OR APPLICATIONS

| | | | |
|---|---|---|---|
| 976,049 | 11/1964 | Great Britain | 180/68 |
| 219,834 | 6/1942 | Switzerland | 180/54 A |
| 1,150,725 | 8/1957 | France | 180/54 A |

*Primary Examiner*—Leo Friaglia
*Assistant Examiner*—Milton L. Smith
*Attorney*—Robins V. Tate, Harold W. Grothman and Spencer B. Michael

[57] ABSTRACT

This invention comprises a self-contained engine cooling system for a vehicle. This cooling system has a housing with an air inlet near the top of the housing and an air outlet located below the air inlet in a generally vertical direction. A radiator and one or more air circulators for moving air past the radiator are located within the housing and between the air inlet and air outlet. This self-contained engine cooling system is adaptable particularly for behind the cab mounting on trucks and similar vehicles.

12 Claims, 5 Drawing Figures

PATENTED FEB 6 1973
3,715,001
SHEET 1 OF 2
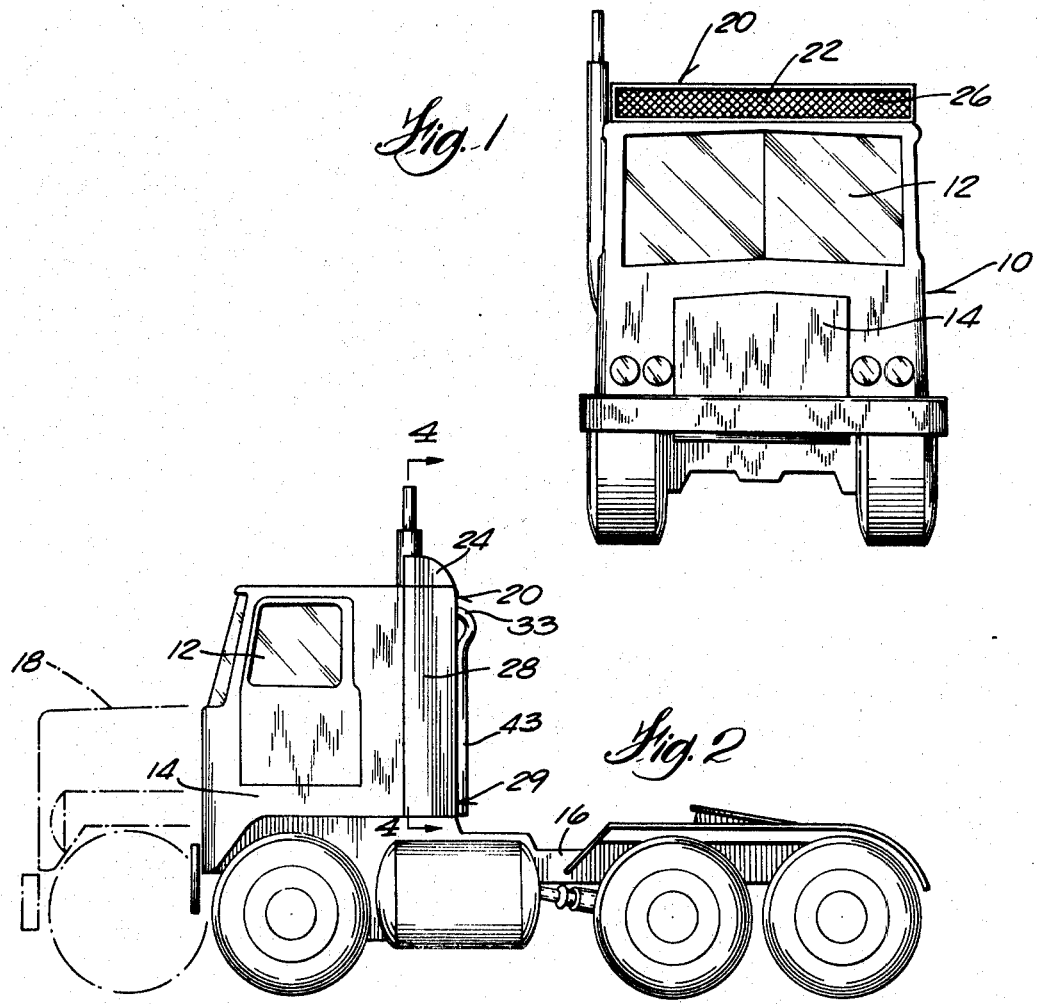
Fig. 1
Fig. 2
Fig. 3
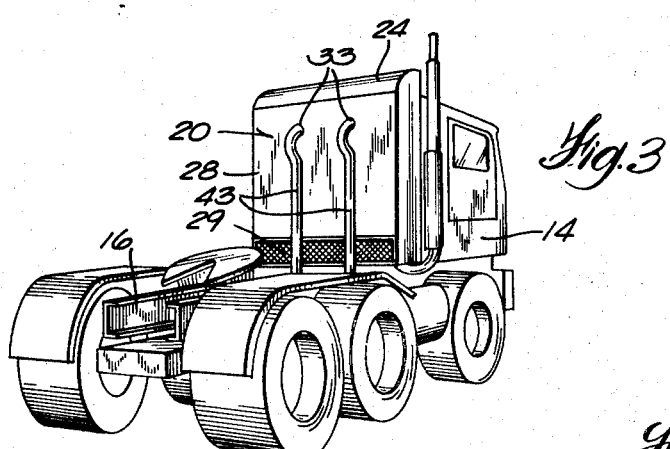
Inventor
Harry R. Wilson
By Harold N. Gutman
Attorney

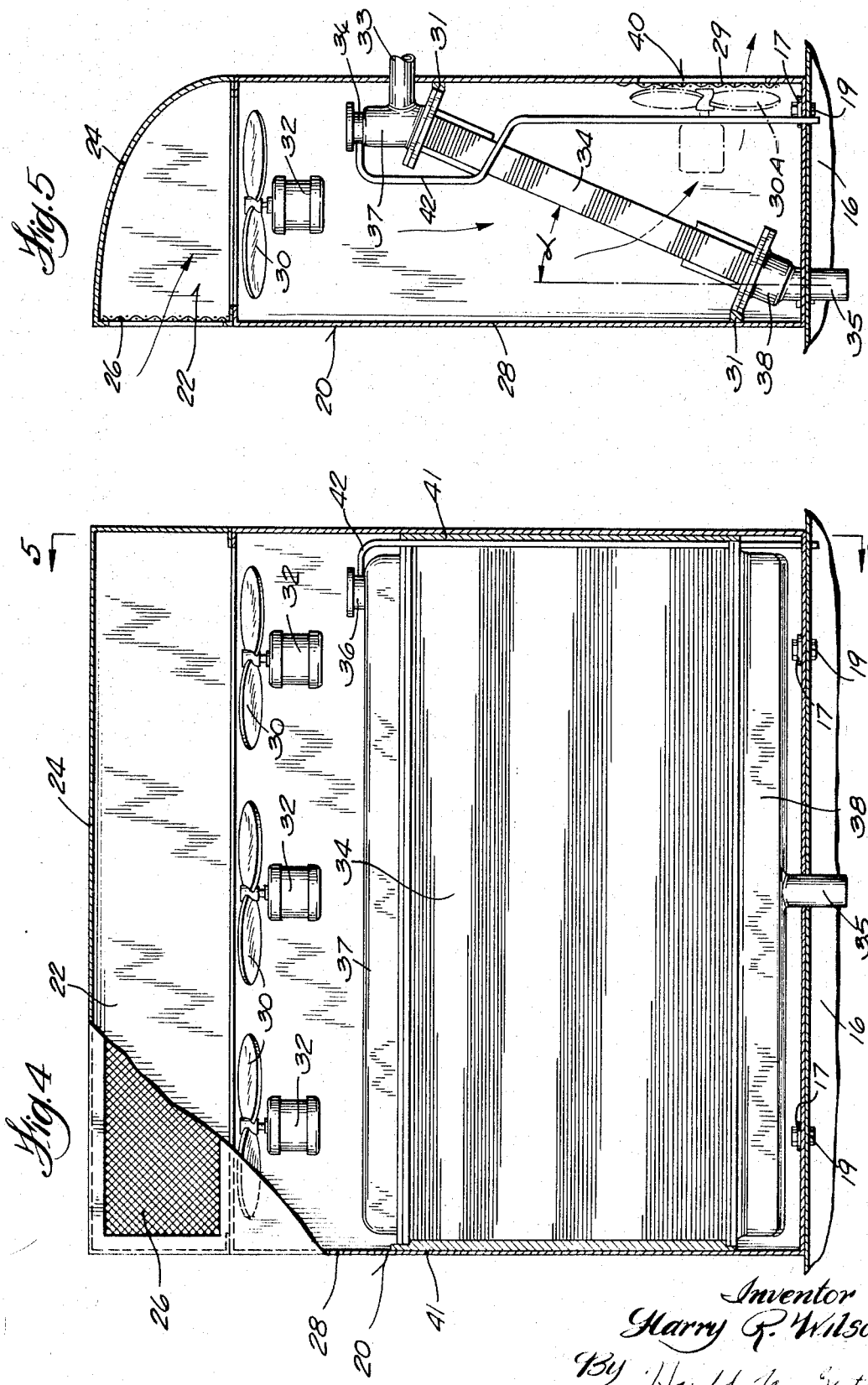

ENGINE COOLING SYSTEM FOR VEHICLES

BACKGROUND OF THE INVENTION

This invention relates to the art of engine cooling systems and, in particular, to the art of cooling systems for vehicles utilizing radiators.

A great majority of the engine powered vehicles in the world today have engines that are cooled by radiators mounted in front of the vehicle. Generally, the front mounted radiator has proven satisfactory for almost all types of vehicles and has been accepted as the standard design for many years on automobiles and trucks. However, there has been a growing need, particularly in the trucking industry, for a new cooling system design in order to maximize the cooling capability and to minimize the peripheral dimensions of the vehicles. This need has been accentuated in the field of diesel engines where the demand for engines with upwards from 400 HP has required a complete redesign of the cooling system in view of space limitations. These space limitations are due not only to the environmental on-highway and off-highway conditions but also to the various state laws that are directed particularly to the combined length of the truck-tractor and trailer, or trailers, within the trucking industry. Other types of vehicles such as crawler tractors, boats, and other off-highway vehicles have had similar demands for improved cooling systems.

The prior patent art includes U.S. Pat. No. 2,913,065 showing an automotive cooling system, and U.S. Pat. No. 2,769,501 showing a truck with a front mounted radiator.

OBJECTS AND SUMMARY OF THE INVENTION

It is an object of the invention to provide a cooling system with a minimum amount of lateral area required and a maximum amount of cooling.

It is a second object to provide a cooling system for a vehicle that is mounted to add a minimum amount to the overall length of the vehicle or of a vehicular combination.

It is another object of this invention to provide a cooling system for an engine and other heat producing areas of a vehicle that is mounted so the air inlet is substantially free of debris and other contaminents from the ground.

Finally, it is an object to provide a self-contained cooling system for a vehicle that is readily accessible for maintenance and service.

In view of the above objects, this invention provides a cooling system particularly suited for highway vehicles that require above average cooling capacity for the engine. This cooling system is self-contained within a housing that is mounted in a generally vertical direction. An air ingress is provided near the top of the housing and an air egress is provided near the bottom of the housing. Preferably, an air scoop is attached to the air ingress facing forwardly so that air is forced downwardly through the housing as the vehicle moves forwardly. One or more radiators are mounted in the housing, preferably diagonally, so they transverse the air flow. One or more air circulating devices are located above or below the radiator. This cooling system is suitable for cooling fluids such as engine coolant water, lubricating oil, transmission oil or air conditioning refrigerant. BRIEF DESCRIPTION OF THE DRAWINGS In the drawings:

FIG. 1 shows a front view of a truck with the cooling system of the invention mounted thereon;

FIG. 2 shows a side view of the truck with the same cooling system;

FIG. 3 shows a perspective view from the rear of the truck with the same cooling system;

FIG. 4 is a sectional view along line 4—4 on FIG. 2 showing the inside of the cooling system with a fragmented portion showing the external surface of the air inlet; and FIG. 5 is a sectional view along line 5—5 on FIG. 4 showing the side view of the inside of the cooling system.

DESCRIPTION OF THE PREFERRED EMBODIMENT

In one embodiment, the cooling system 20 is shown in FIG. 1 extending over the cab 12 of a cab-over-engine type of truck tractor 10. This well known cab-over-engine type is shown as an example since this design for a truck tractor has a minimum length which is one of the objects of this invention. The minimum length is achieved by mounting the engine in the space 14 under the cab 12. Air inlet 22 for the cooling system 20 extends over the cab 12 and forms an air scoop 24 that may be covered by a screen or grill 26, as shown more clearly in FIGS. 4 and 5.

FIG. 2 shows a side profile of the self-contained cooling system 20 wherein the air flow enters through air scoop 24 and proceeds downwardly through housing 28 before exiting through air outlet 29. Housing 28 is mounted on the chassis 16 of truck tractor 12 by using bolts 19, brackets, bars, channels or other means well known to those skilled in the art. This mounting is seen best in FIG. 4 and will be described hereafter. An alternate design mounts the cooling system 20 on the truck trailer cab 12. A combination of chassis 16 mounting and cab 12 mounting may be used also; this combination will give the greatest amount of dynamic stability.

FIG. 3 provides a rear view of cooling system 20 with the housing 28 having air scoop 24 on top and air outlet 29 near the bottom.

Internal construction for cooling system 20 is illustrated in FIGS. 4 and 5. Mounting bolts 19 secure the housing 28 for cooling system 20 to mounting bars 17 on the truck tractor chassis 16. FIG. 4 is a sectional view showing the air inlet 22 covered by grill 26 through which the air is pulled by fans 30. Fans 30 are driven by pneumatic drives 32. Other drive systems, such as electric or hydraulic motors, have proven satisfactory for driving the air circulating means in place of pneumatic drives 32.

The fans 30 push the air through the radiator 34 and out through air outlet 29 as shown in FIG. 5. Radiator 34 may be of a conventional fin tube type but with certain modifications to allow the filling neck 36 to remain upright even though there is an angular mounting $\alpha$ of the radiator 34. It has been found that an angular mounting $\alpha$ of approximately 22° from vertical permits a smooth air flow downwardly through housing 28, through radiator 34 and horizontally out through air outlet 29. Air outlet 29 may be covered by a screen or grill 40. The angle of the radiator mounting may vary with design parameters; other radiator mounting designs, such as horizontal, vertical, or other angular mountings are possible with the proper baffling arrangements. In addition, more than one radiator may be used on top of or along side of other radiators in order to increase the amount of cooling.

Fluid inlets 33 permit the engine cooling liquid to enter near the top of the radiator 34. Fluid outlet 35 permits the engine cooling liquid to exit near the bottom of the radiator 34. An overflow pipe 42 permits any excess cooling liquid or air to be exhausted from the radiator 34. Engine 14 is provided with hose connections 43 or other suitable connecting devices to the fluid inlet 33 and from fluid outlet 35. The hose connections 43 and fluid inlets 33 may extend laterally to the exterior of the housing 20; an alternate design would connect the fluid inlets internally to the bottom of the housing 20.

Radiator 34 has an upper header 37 and a lower header 38, both of which seal 31 the upper and lower portions of the radiator to the side of the housing 28. Gasket material may be used to improve the seals; this is well known to those skilled in this art. Likewise, spaces 41 at the sides of the radiator are sealed to the side of the housing 28. Spaces that are sealed at 31 and 41 may be provided also with a rubber vibration pad in order to prevent vibration damage to the radiator and noise caused by vibration. This is also well known to those skilled in the arts of vibration and noise prevention.

The fans 30 are mounted near the air inlet 22 as shown in FIGS. 4 and 5. However, mounting of a fan or fans designated by 30A and shown with dotted lines in FIG. 5 is an alternative design. This latter design has the advantage of removing a possible source of vibration and noise to a location further from the truck drivers located in the cab 12. Fans 30 may be operable all the time that the vehicle engine is running; however, some highway operating conditions would permit a lessening or elimination of fan operations due to sufficient air movement through the air scoop 24, through the radiator 34 and out through air outlet 29.

It will be appreciated by those skilled in the vehicle cooling art that ordinarily in warm weather, the air entering through the elevated air scoop 24 will be at a lower temperature than air in close proximity to the highway, especially on black surfaced roads exposed to sunlight. Therefore, cooling will be enhanced in comparison to a cooling system with a near road surface air intake.

FIGS. 1 through 3 show air inlet 22 facing forwardly and air outlet 29 facing rearwardly. However, cooling system 10 would be operative even though the air inlet 22 was directed upwardly, rearwardly or to the side and air outlet 29 was directed downwardly or to the side. Those skilled in the vehicle cooling art will appreciate that a side exhaust system may require special design to prevent excessive air movement that creates unsafe road conditions for other vehicles.

The specific embodiments shown and described heretofore have been limited generally to a truck with the subject cooling system mounted behind the truck cab. It should be understood that mountings in other locations, such as to one side of the cab, are possible. Furthermore, usage of this cooling system on other types of vehicles will require mountings in different locations. Therefore, it should be understood that the specific embodiments are merely representative of the invention and that the appended claims should be interpreted in light of the full scope and spirit of the invention.

I claim:

1. A self-contained engine cooling system using air as a coolant and adapted for attachment to a vehicle, comprising:
   self-contained housing means for said cooling system, said housing means being structurally independent of the body of said vehicle;
   means for mounting said housing to said vehicle;
   ingress means for the air near the top of said housing means;
   egress means located in a generally vertical direction below said ingress means;
   radiator means located within said housing means and traversing the flow of said air within said housing means;
   connecting means for connecting fluid lines containing heat exchange fluid to and from said radiator; and
   air circulating means within said housing means for pulling said air through said ingress means and forcing said air out said egress means.

2. The invention as claimed in claim 1 in which said self-contained housing means is elongated and extends in a generally vertical direction.

3. The invention as claimed in claim 1 in which said ingress means includes an air scoop for directing said air into said housing.

4. The invention as claimed in claim 3 in which said air scoop has an opening facing forwardly of said vehicle.

5. The invention as claimed in claim 1 in which said egress means has an opening facing rearwardly of said vehicle.

6. The invention as claimed in claim 1 in which said radiator means includes a radiator mounted diagonally with the vertical direction.

7. The invention as claimed in claim 1 in which said air circulating means includes at least one fan located near said ingress means.

8. The invention as claimed in claim 1 in which said air circulating means includes at least one fan located near said egress means for directing said air rearwardly.

9. In a truck tractor having a chassis frame, an engine and body including a cab, the improvement being an engine cooling system comprising:
   a self-contained housing for said engine cooling system, said housing being structurally independent of said body and frame;
   means for mounting said housing on said truck tractor, behind said cab;
   a first opening in said housing near the top of said housing providing an air inlet;
   a second opening in said housing near the bottom of said housing providing an air outlet;
   at least one radiator mounted in said housing between said first opening and said second opening; and
   at least one air circulating device for forcing air into said first opening through said radiator and out through said second opening.

10. The invention as defined in claim 9 in which said radiator is mounted with the periphery sealed to said housing so that substantially all of said air is directed through said radiator.

11. The invention as defined in claim 9 in which said radiator is mounted diagonally from the side of said housing.

12. The invention as defined in claim 9 in which substantially all of said housing is located behind said engine.

* * * * *